United States Patent
Momii et al.

(10) Patent No.: US 9,033,381 B2
(45) Date of Patent: May 19, 2015

(54) VEHICLE BUMPER MOUNTING STRUCTURE

(75) Inventors: Motoyuki Momii, Wako (JP); Yuuki Taguchi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/008,736

(22) PCT Filed: Mar. 27, 2012

(86) PCT No.: PCT/JP2012/057911
§ 371 (c)(1),
(2), (4) Date: Nov. 21, 2013

(87) PCT Pub. No.: WO2012/137627
PCT Pub. Date: Oct. 11, 2012

(65) Prior Publication Data
US 2014/0084609 A1  Mar. 27, 2014

(30) Foreign Application Priority Data
Apr. 1, 2011 (JP) ................. 2011-081377

(51) Int. Cl.
*B60R 19/24* (2006.01)
(52) U.S. Cl.
CPC ........... *B60R 19/24* (2013.01); *B60R 2019/247* (2013.01)
(58) Field of Classification Search
CPC ............ B60R 19/24; B60R 2019/247; B60G 2206/11; B60G 2206/8101; B60G 11/183; B60G 21/051; B60G 2206/30; B60G 2206/7102; B60G 7/001; B60G 15/068; B60G 15/07; B60G 2204/45021; B60G 2206/60
USPC ......... 293/154, 132–133, 121–122, 102, 113, 293/115, 117, 155; 296/191, 203.02, 296/187.03, 146.6
See application file for complete search history.

(56) References Cited

U.S. PATENT DOCUMENTS

| | | | | |
|---|---|---|---|---|
| 5,108,138 A * | 4/1992 | Kawaguchi | ................ | 293/120 |
| 6,893,064 B2 * | 5/2005 | Satou | ............... | 293/132 |
| 6,926,327 B2 * | 8/2005 | Shibata | ............ | 293/155 |
| 7,407,825 B2 * | 8/2008 | Rommeveaux | .............. | 438/30 |
| 7,766,402 B2 * | 8/2010 | Schmidt et al. | ............ | 293/117 |

FOREIGN PATENT DOCUMENTS

| | | |
|---|---|---|
| DE | 10147621 | 4/2003 |
| FR | 2939396 | 6/2010 |
| JP | S58-3376 U | 1/1983 |
| JP | 2005 096597 | 4/2005 |
| JP | 2007-283995 | 11/2007 |
| JP | 4482537 | 6/2010 |
| JP | 2010-241159 | 10/2010 |

OTHER PUBLICATIONS

International Search Report dated Jun. 26, 2012.
European Search Report dated Sep. 30, 2014, 5 pages.

* cited by examiner

*Primary Examiner* — Glenn Dayoan
*Assistant Examiner* — Sunsurraye Westbrook
(74) *Attorney, Agent, or Firm* — Rankin, Hill & Clark LLP

(57) ABSTRACT

A fender front-side step portion has first and second fender front-side fixing portions that engage with and fasten a bumper spacer. The bumper spacer is provided with: a spacer body; a bumper-spacer reinforcing portion that extends toward a fender lower-end portion of a fender panel from the bottom end of the spacer body; and a bumper-spacer rear-side fixing portion which is disposed on the bumper-spacer reinforcing portion, and which overlaps with and fastens the front of the fender lower-end portion. The bumper-spacer rear-side fixing portion is disposed in a position further to the rear than the fender front-side step portion in the longitudinal direction of a vehicle.

5 Claims, 10 Drawing Sheets

VEHICLE BUMPER MOUNTING STRUCTURE

TECHNICAL FIELD

The present invention relates to a bumper mounting structure for a vehicle, where the bumper mounting structure enables mounting of a bumper face to fender panels by use of bumper spacers.

BACKGROUND ART

For example, Patent Literature 1 discloses a vehicle bumper mounting structure. In the vehicle bumper mounting structure disclosed in Patent Literature 1, a front end portion of a fender panel is mounted on an end portion of a bumper face through a bumper spacer.

The vehicle bumper mounting structure disclosed in Patent Literature 1 includes in the bumper spacer: engagement clicks which can be engaged with engagement holes in a bumper side wall from the back side of the bumper side wall; and a fall-prevention hook which prevents a fall of the bumper spacer by wrapping around a fender side wall to the back surface of the fender side wall and abutting on the back surface of the fender side wall. Patent Literature 1 discloses that the above provision enables precise mounting of the bumper spacer to the fender panel.

PRIOR ART LIST

Patent Literatures

Patent Literature 1: Japanese Registered Patent No. 4482537

SUMMARY OF INVENTION

Technical Problem

However, in the vehicle bumper mounting structure disclosed in Patent Literature 1, the bumper spacer is constituted by a horizontal block and a tilted block, and fixed by only a fender mounting portion which extends from the tilted block. Therefore, there is a possibility that the precision in arrangement of borders in the front-rear direction of the vehicle is lowered. The lowering in the precision in arrangement of borders becomes particularly remarkable when an integral fender molding is mounted.

In addition, in the vehicle bumper mounting structure disclosed in Patent Literature 1, a fender molding (wheel arch molding) is held between the fender panel and the bumper face, and thereafter the fender molding is fastened with bolts. Therefore, the operation of fastening the bolts is complicated.

The general object of the present invention is to provide a vehicle bumper mounting structure which can improve the precision in arrangement of the borders at the gap between the fender panel and the bumper face.

The main object of the present invention is to provide a vehicle bumper mounting structure which can improve the work efficiency in the operation of mounting the bumper spacer.

Solution to Problem

To achieve the objet, the present invention provides a vehicle bumper mounting structure in which a fender side wall is bent toward inside of a vehicle body at a front end portion of a fender panel, a fender front-side step portion is bent at an end portion of the fender side wall toward a direction away from the fender panel, and a bumper spacer is placed on the fender front-side step portion, characterized in that:

the fender front-side step portion includes a fender front-side fixing portion being engaged with and fixing the bumper spacer;

the bumper spacer includes:
a spacer body,
a bumper-spacer reinforcing portion extending from a lower end portion of the spacer body toward a lower end portion of the fender panel, and
a bumper-spacer rear-side fixing portion being arranged in the bumper-spacer reinforcing portion, and being overlapped with and fixing a front side of the lower end portion of the fender panel; and the bumper-spacer rear-side fixing portion is arranged on a rear side of the fender front-side step portion in a front-rear direction of a vehicle.

According to the present invention, the bumper-spacer rear-side fixing portion is arranged on the rear side of the fender front-side step portion in the front-rear direction of the vehicle. Therefore, the fender panel can be fixed to the bumper spacer even in the vicinity of the border portion between the bumper face and the fender panel. As a result, according to the present invention, rocking, in the vehicle width direction (the right-left direction), of the front-side portion of the lower end portion of the fender panel can be prevented. In addition, the border portion (the gap) between the bumper face and the fender panel becomes even, so that the marketability is increased by the appearance.

The present invention provides a vehicle bumper mounting structure, wherein the fender panel includes a tilted fender surface formed on an upper side of a ridge portion and a vertical fender surface formed on a lower side of the ridge portion, the ridge portion extends approximately parallel to a wheel arch at a boundary between the tilted fender surface and the vertical fender surface in a vicinity of approximately a center of the fender panel, the fender front-side step portion is formed integrally with both of the tilted fender surface and the vertical fender surface, and at least one of the fender front-side fixing portion is arranged on each of the tilted fender surface side and the vertical fender surface side of the fender front-side step portion.

According to the present invention having the above additional feature, the fender front-side step portion is integrally formed to extend from both of the tilted fender surface and the vertical fender surface of the fender panel. Therefore, the fender front-side step portion has high rigidity and resists deformation, so that the fender front-side step portion can firmly fix the bumper face. In addition, since deformation of the bumper face can be avoided and displacement in the front-rear direction of the vehicle can be prevented, the border portion (the gap) between the bumper face and the fender panel becomes even, so that the marketability is increased by the appearance.

The present invention provides the vehicle bumper mounting structure, wherein the fender panel includes a tilted fender surface formed on an upper side of a ridge portion and a vertical fender surface formed on a lower side of the ridge portion, the ridge portion extends approximately parallel to a wheel arch at a boundary between the tilted fender surface and the vertical fender surface in a vicinity of approximately a center of the fender panel, the fender front-side step portion is formed integrally with both of the tilted fender surface and the vertical fender surface, and at least one of the fender front-side fixing portion is arranged on each of the tilted fender surface side and the vertical fender surface side of the fender front-side step portion.

According to the present invention having the above additional feature, a lower end portion of the bumper face is fixed on the virtual straight line passing through the bumper-spacer lower-side fixing portion and the plurality of fender front-side fixing portions. Therefore, it is possible to increase the support rigidity in the vehicle width direction (right-left direction), keep the precision in the outer surfaces of the wheel arch molding, the bumper face, and the fender panel, and improve the marketability by the appearance.

The present invention provides the vehicle bumper mounting structure, wherein the fender front-side fixing portion and the bumper-spacer rear-side fixing portion are mounted and fixed from outside in a vehicle width direction.

According to the present invention having the above additional feature, each of the one or more fender front-side fixing portions and the bumper-spacer rear-side fixing portion is mounted and fixed from outside in the vehicle width direction (right-left direction). Therefore, it is possible to increase the support rigidity of the fender panel in the vehicle width direction, and improve the work efficiency in the operation of mounting the bumper spacer.

The present invention provides the vehicle bumper mounting structure, wherein ribs radially extending from a fixed hole are integrally formed in the bumper-spacer lower-side fixing portion, and the fixed hole is arranged at approximately a center of the bumper-spacer lower-side fixing portion.

According to the present invention having the above additional feature, for example, even in the case where a cutoff portion for mounting an on-vehicle functional part is arranged in a vicinity of a fender lower-side step portion, the radially extending ribs secure the strength of the bumper-spacer lower-side fixing portion, so that it is possible to keep the precision in the outer surfaces of the wheel arch molding, the bumper face, and the fender panel, and improve the marketability by the appearance.

Advantageous Effect of Invention

According to the present invention, it is possible to increase the precision in arrangement of the borders at the gap between the fender panel and the bumper face, and improve the work efficiency in the operation of mounting the bumper spacer.

DESCRIPTION OF EMBODIMENTS

Figure 1:
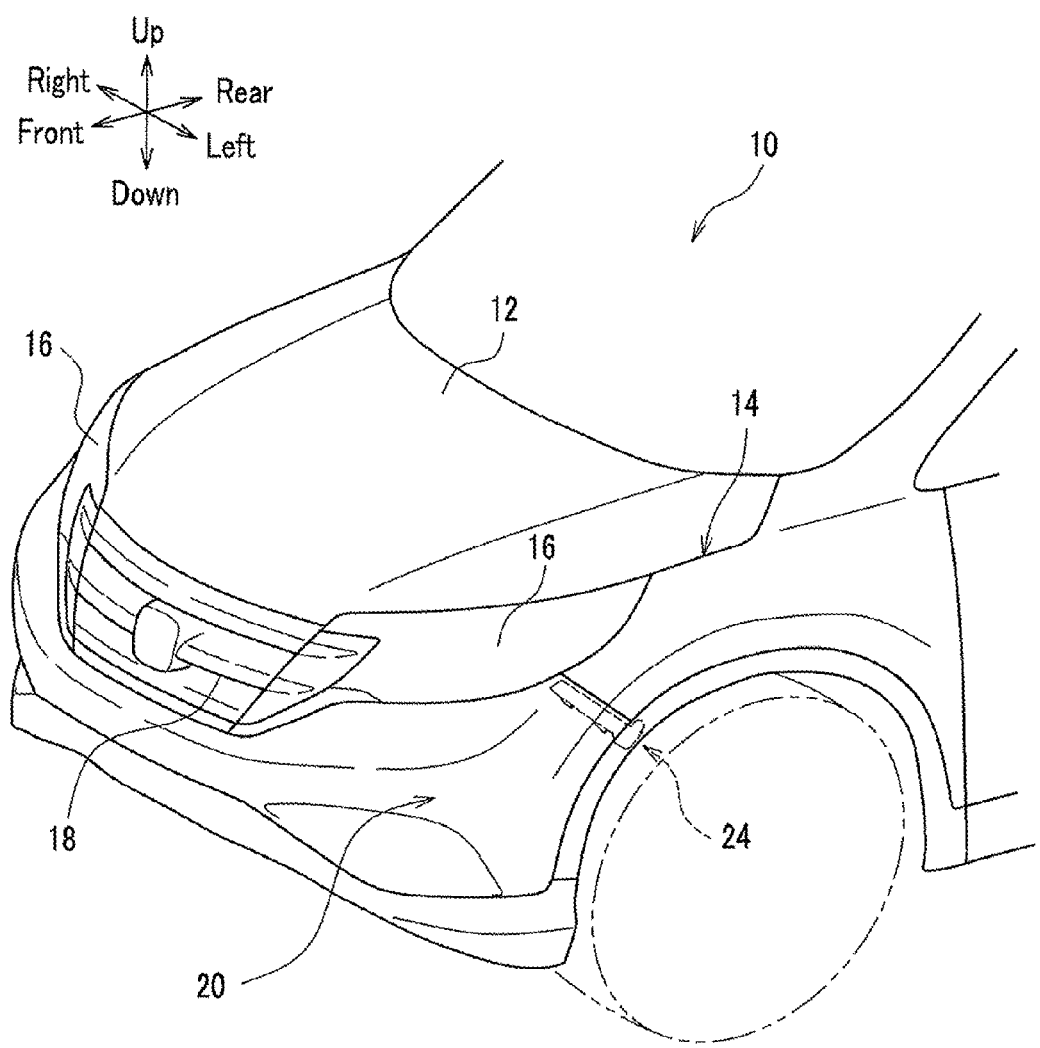
FIG. 1 is a perspective view of a front portion of a vehicle to which a vehicle bumper mounting structure according to an embodiment of the present invention is applied.

Hereinbelow, the embodiment of the present invention is explained in detail below with reference to drawings when necessary. FIG. 1 is a perspective view of a front portion of a vehicle to which the vehicle bumper mounting structure according to the embodiment of the present invention is applied. Hereinafter, it is assumed that the front-rear direction, the vertical direction, and the right-left direction of the vehicle are as illustrated in FIG. 1.

As illustrated in FIG. 1, the front portion of the vehicle 10 is constituted by right and left fender panels 14 respectively arranged on the right and left sides of the hood (bonnet) 12, right and left headlights 16 each arranged between the hood 12 and front end portions of the right or left fender panel 14, a front grill 18 arranged between the right and left headlights 16, and a bumper face 20 arranged below the front grill 18 and attached to the front end portions of the right and left fender panels 14. (The right fender panel is not illustrated in FIG. 1.)

Since the right and left fender panels 14 have bilaterally symmetric shapes, hereinbelow only the left fender panel 14 is explained in detail, and explanations on the right fender panel 14 are omitted. (Hereinafter, the left fender panel 14 is simply referred to as the fender panel 14.)

Figure 2:
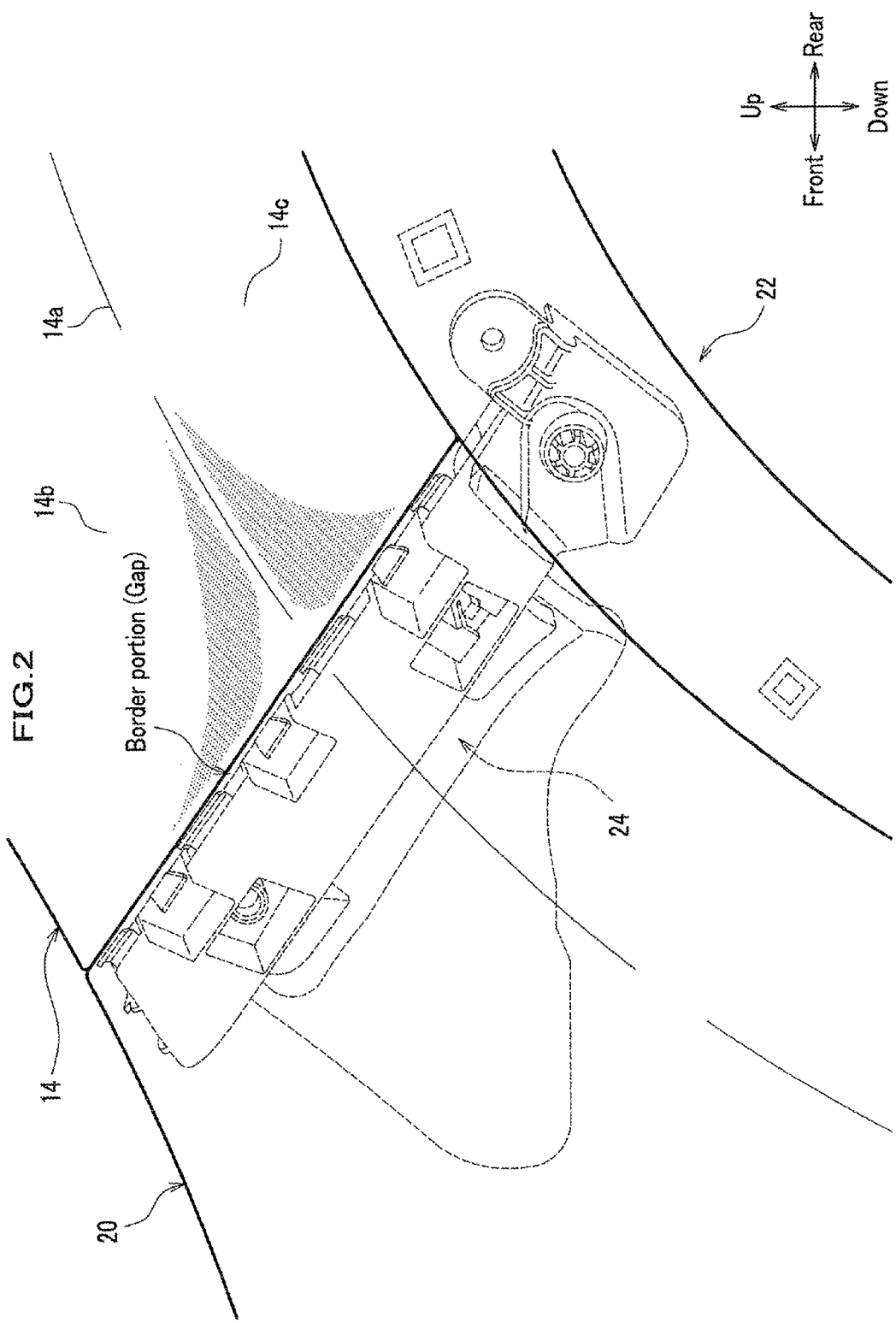
FIG. 2 is a partially magnified transparent view, through a bumper face, of a front left portion of a vehicle.
Figure 3:
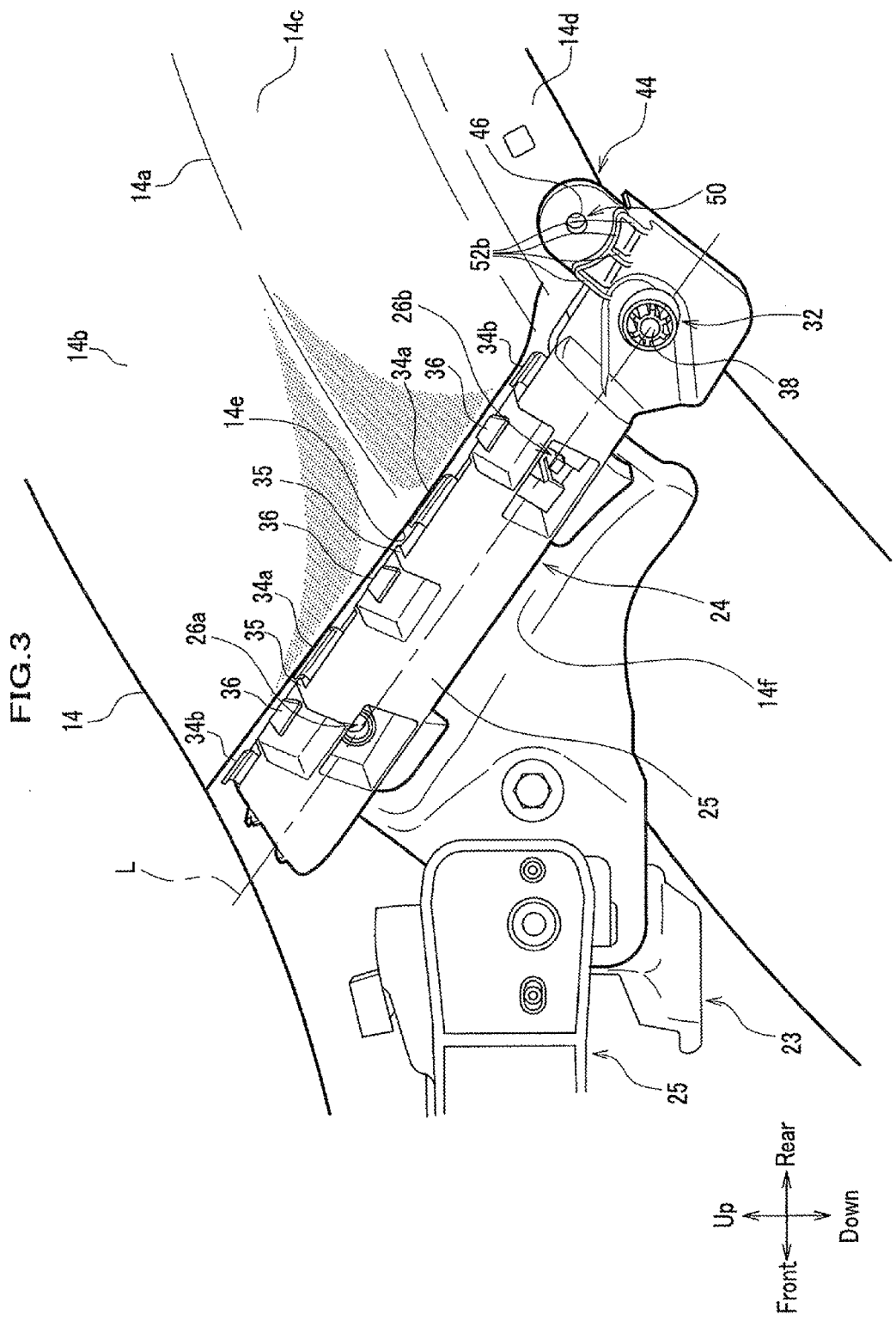
FIG. 3 is a partially magnified perspective view of the portion illustrated in FIG. 2 from which the bumper face and the wheel arch are removed.

As illustrated in FIGS. 2 and 3, the fender panel 14 includes a tilted fender surface 14b formed on the upper side of a ridge portion 14a, a vertical fender surface 14c formed on the lower side of the ridge portion 14a, and a fender lower-end portion 14d which extends on the lower side of the vertical fender surface 14c and on which a wheel arch 22 is mounted, where the ridge portion 14a extends approximately parallel to the wheel arch 22 at the boundary between the tilted fender surface 14b and the vertical fender surface 14c in a vicinity of approximately the center of the fender panel 14. Although the wheel arch 22 in the present embodiment is an integrally formed type as illustrated in FIG. 1, the wheel arch 22 may be a separate type.

In addition, a fender side wall 14e, which is bent toward the inside of the vehicle body, is arranged in the front end portion of the fender panel 14 in the front-rear direction of the vehicle. Further, a fender front-side step portion 14f is arranged at an end portion of the fender side wall 14e. The fender front-side step portion 14f is bent toward a direction away from the fender panel 14, and the bumper spacer 24, which is explained later, is placed on the fender front-side step portion 14f. Furthermore, in FIGS. 3 and 4, the reference number 23 denotes a support bracket having an end portion fastened to the fender front-side step portion 14f with bolts and nuts and another end portion fixed to a structural member (which is not shown), and the reference number 25 denotes an upper-beam bracket having an end portion fixed to the front end portion of the fender front-side step portion 14f.

Figure 4:
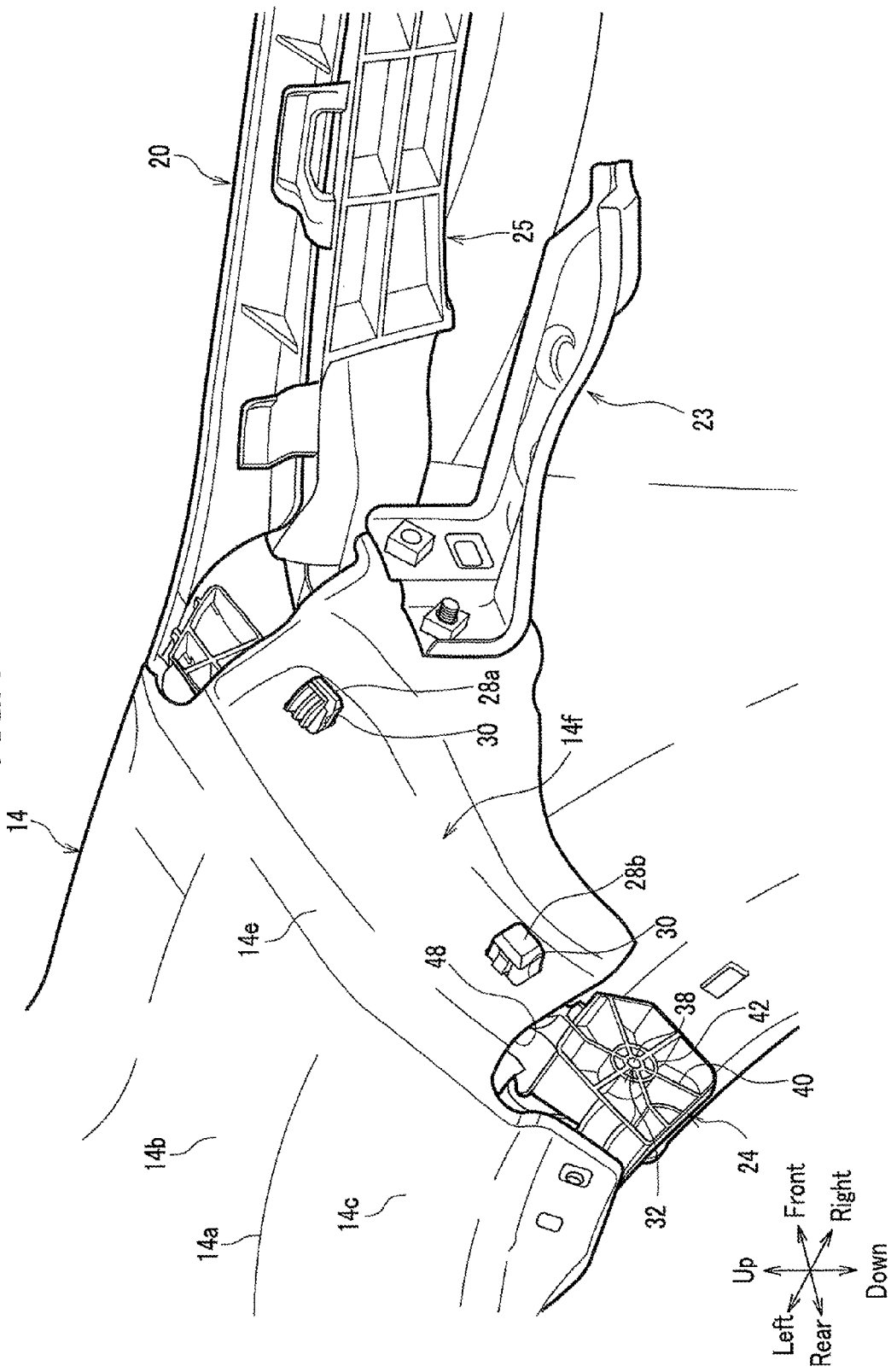
FIG. 4 is a perspective view, from the back side, of the front left portion of the vehicle.

In the above case, as illustrated in FIG. 4, the fender front-side step portion 14f extends from both of the tilted fender surface 14b and the vertical fender surface 14c and is integrally formed (i.e., united). In addition, a first fender front-side fixing portion 26a and a second fender front-side fixing portion 26b are arranged for being engaged with the bumper spacer 24 and fixing the bumper spacer 24 to the fender front-side step portion 14f as explained later.

The first fender front-side fixing portion 26a, which is arranged on the upper side of the bumper spacer 24, includes a clip 28a protruding downward from the bottom surface of the bumper spacer 24, a rectangular hole portion 30 which is formed in the fender front-side step portion 14f and with which the clip 28a is engaged, and a tapping screw (not shown) which is screwed in from the front side of the fender panel 14.

In the first fender front-side fixing portion 26a, the bumper spacer 24 can be fixed on the back side of the fender panel 14 by inserting the clip 28a into the rectangular hole portion 30 engaging the clip 28a with the rectangular hole portion 30, and screwing the tapping screw (not shown) in from the front side of the fender panel 14 toward the tip of the clip 28a (as illustrated in FIG. 4). Alternatively, another screw member (which is not shown), instead of the tapping screw, may be used.

The second fender front-side fixing portion 26b, which is arranged on the lower side of the bumper spacer 24, includes a clip 28b protruding downward from the bottom surface of the bumper spacer 24 (as explained later) and a rectangular hole portion 30 which is formed in the fender front-side step portion 14f and with which the clip 28b is engaged. In the second fender front-side fixing portion 26b, the bumper spacer 24 can be fixed on the back side of the fender panel 14 by inserting the clip 28b into the rectangular hole portion 30 and engaging the clip 28b with the rectangular hole portion 30 (as illustrated in FIG. 4). As in the second fender front-side fixing portion 26a, the bumper spacer 24 may be fixed on the back side of the fender panel 14 by screwing a tapping screw (not shown) in from the front side of the fender panel 14 toward the tip of the clip 28b.

Figure 5:
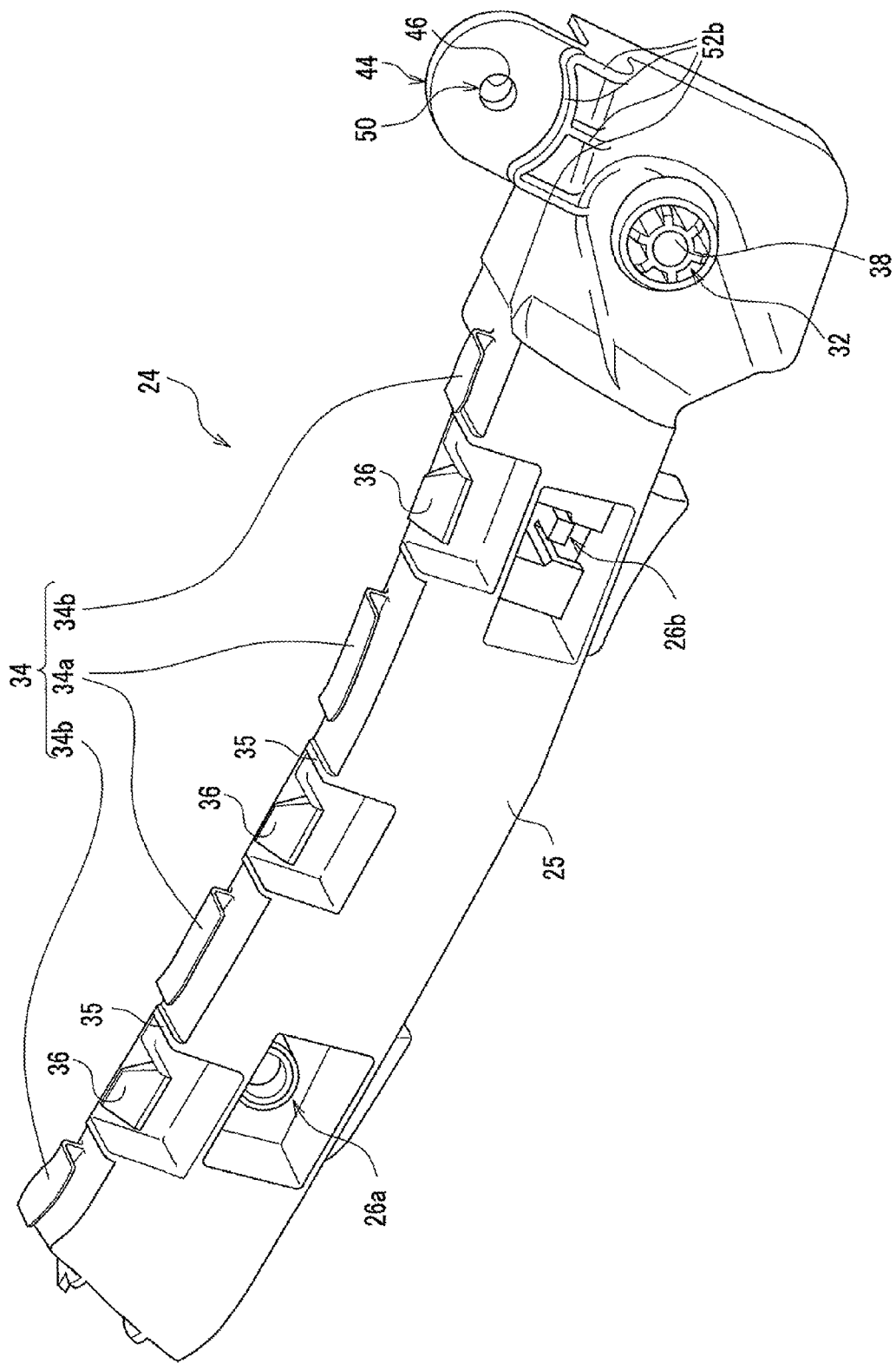
FIG. 5 is a perspective view, from the top side, of a bumper spacer.
Figure 6:
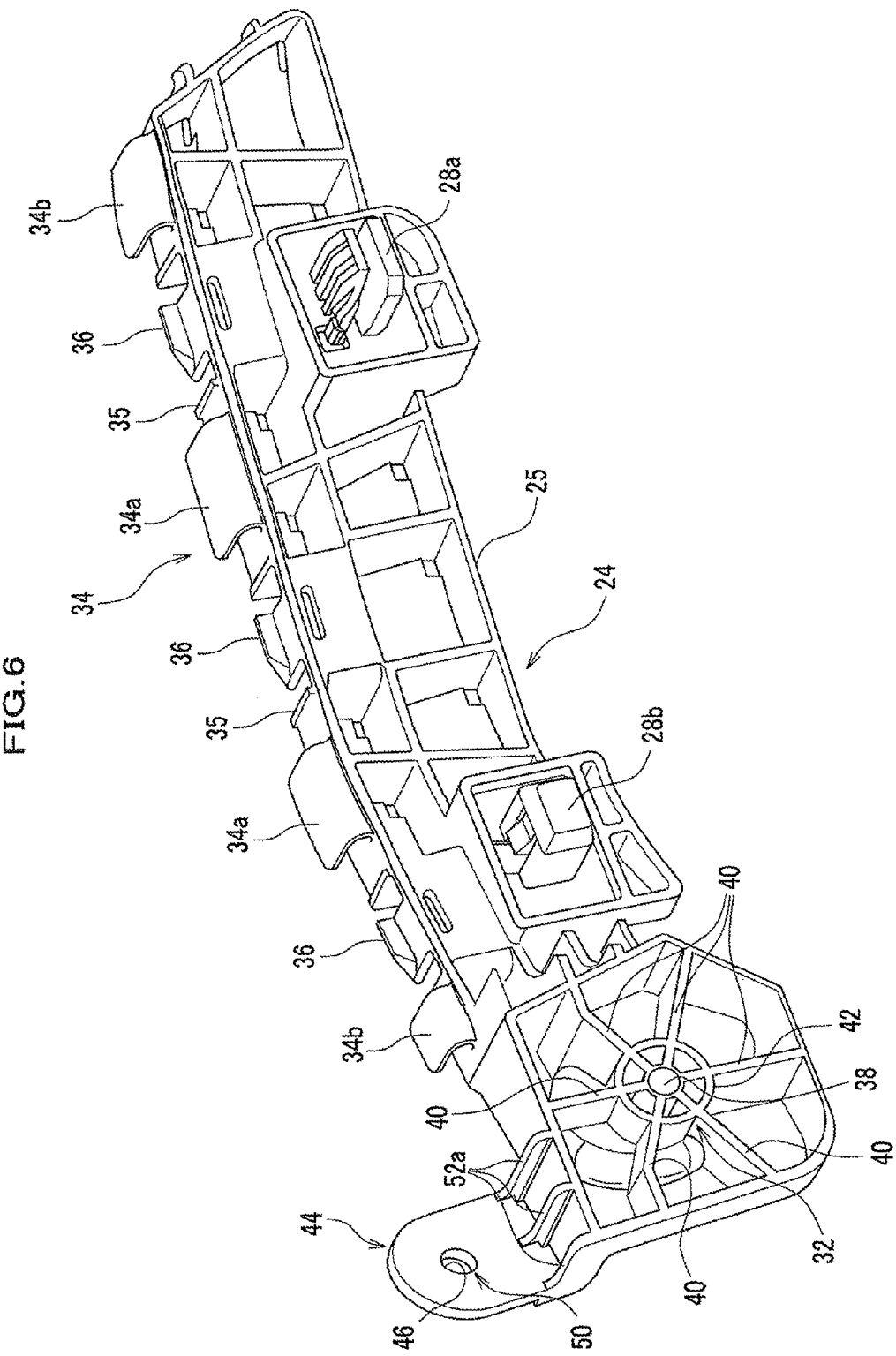
FIG. 6 is a perspective view, from the back side, of the bumper spacer.
Figure 7:
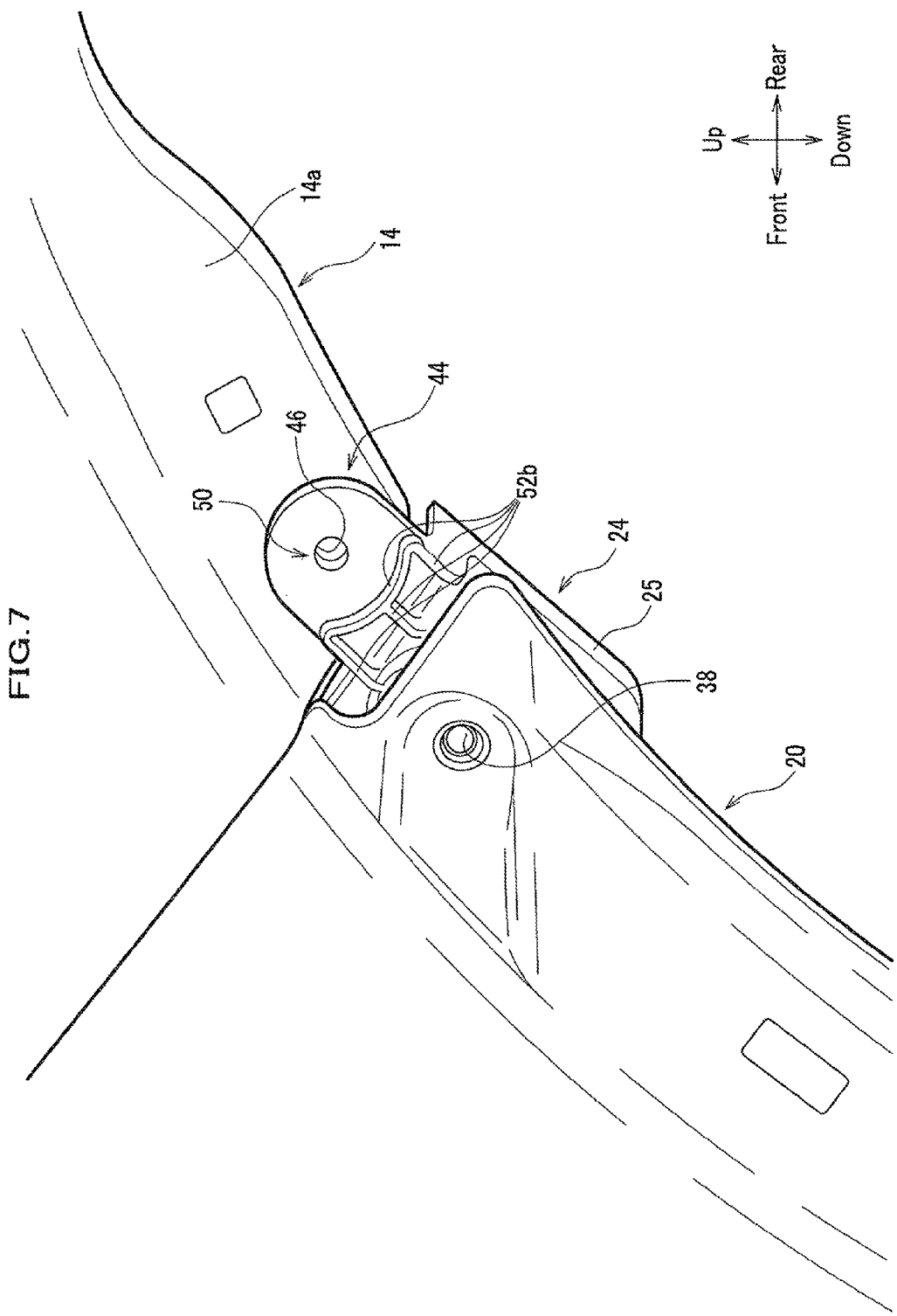
FIG. 7 is a partially magnified perspective view of an assembly in a lower end portion of the bumper spacer.
Figure 8:
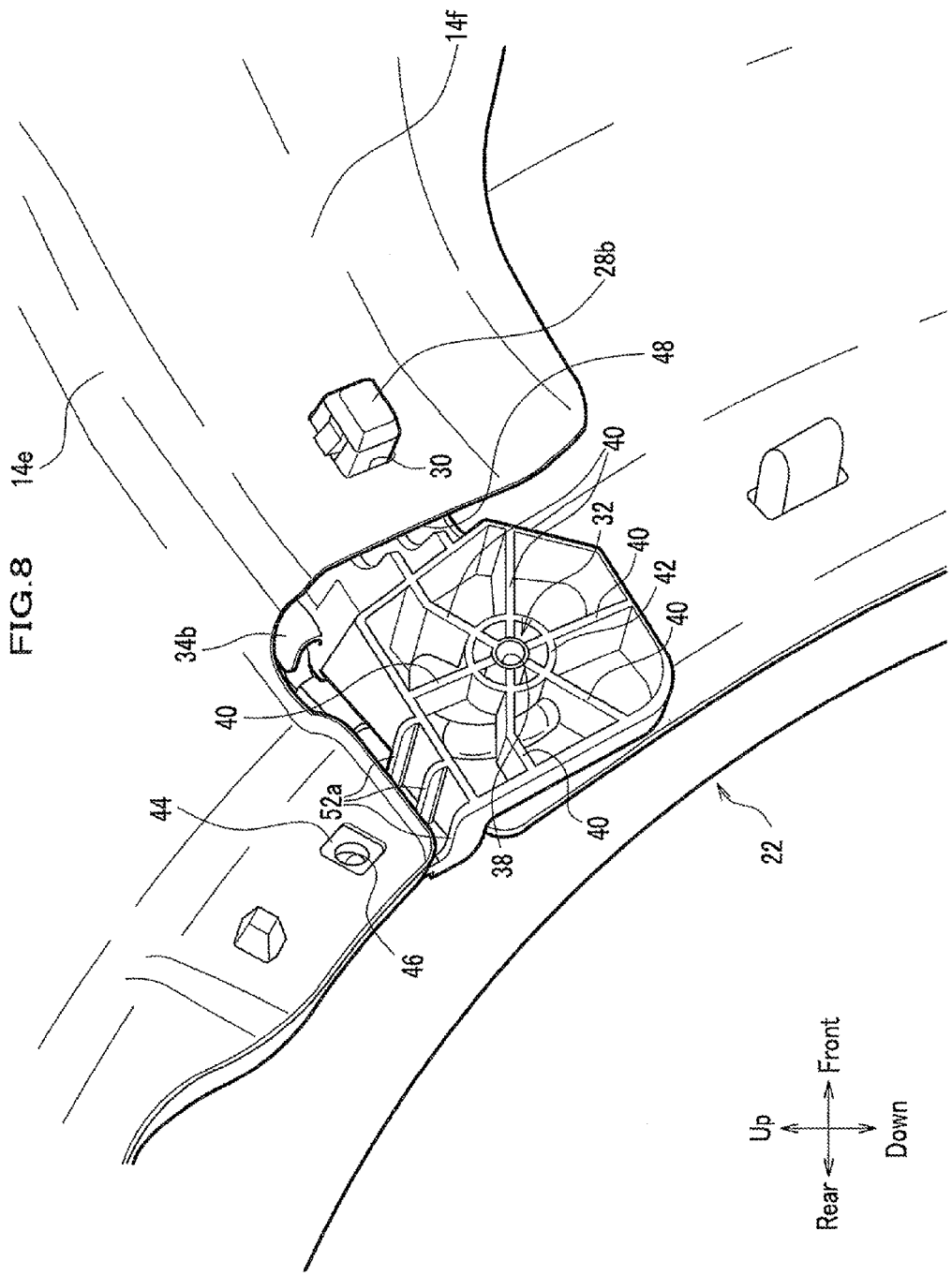
FIG. 8 is a partially magnified perspective view, from the back side, of the assembly of FIG. 7.

FIG. 5 is a perspective view, from the top side, of the bumper spacer, FIG. 6 is a perspective view, from the back side, of the bumper spacer, FIG. 7 is a partially magnified perspective view of an assembly in a lower end portion of the bumper spacer, and FIG. 8 is a partially magnified perspective view, from the back side, of the assembly of FIG. 7.

The bumper spacer 24 includes a spacer body 25, which is formed with an approximately planar elongate block of, for example, a resin material. Multiple lightening holes and multiple thinned portions are formed in the spacer body 25 for weight reduction. As illustrated in FIG. 3, the first fender front-side fixing portion 26a is arranged on the upper side of a portion of the spacer body 25 which is placed on the fender front-side step portion 14f, and the second fender front-side fixing portion 26b is arranged on the lower side of the portion of the spacer body 25 which is placed on the fender front-side step portion 14f. In addition, a bumper-spacer lower-side fixing portion 32 is arranged in a lower end portion of the spacer body 25 which is not placed on the fender front-side step portion 14f.

Figure 12:
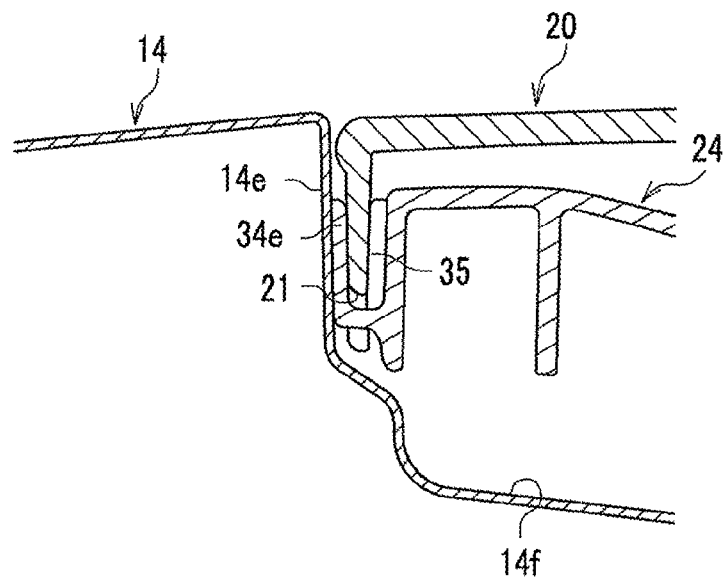
FIG. 12 is a longitudinal cross-sectional view along the XII-XII line indicated in FIG. 11.

A plurality of first guide portions 34 each constituted by a bent portion having an approximately L shape in a longitudinal cross section which is approximately perpendicular to the axis of the spacer body 25 are arranged on a rear-end side portion of the spacer body 25 along the direction of the axis of the spacer body 25 (as illustrated in FIG. 12). Although an example in which four first guide portions 34 are spaced at predetermined intervals along the direction of the axis of the spacer body 25 is illustrated in the present embodiment, the locations and the number of the first guide portions 34 are not limited to the above example. In this case, the plurality of first guide portions 34 include wide ones 34a of the first guide portions 34 and narrow ones 34b of the first guide portions 34, where the wide ones 34a each have a great width in the direction of the axis of the spacer body 25 and are arranged in a vicinity of approximately a center portion of the spacer body 25 in the direction of the axis of the spacer body 25, and the narrow ones 34b each have a small width in the direction of the axis of the spacer body 25 and are arranged in portions of the spacer body 25 near the ends in the direction of the axis of the spacer body 25.

A plurality of fixing clicks 36 having click portions to be engaged with engagement holes 20a (illustrated in FIG. 13) formed in the bumper side wall 21, which is bent toward the inside of the vehicle body at the rear end of the bumper face 20, are arranged between adjacent ones of the first guide portions 34. The fixing clicks 36 are arranged to be elastically deformable such that the elastic deformation enables the click portions to be engaged with the engagement holes 20a. Although an example in which three fixing clicks 36 are spaced at predetermined intervals is illustrated in the present embodiment, the locations and the number of the fixing clicks 36 are not limited to the above example.

A plurality of second guide portions 35 each constituted by a protruding portion which slightly protrudes rearward in the front-rear direction of the vehicle are arranged between the wide ones 34a of the first guide portions 34 and the fixing clicks 36. Although an example in which two second guide portions 35 are spaced by a predetermined distance is illustrated in the present embodiment, the locations and the number of the second guide portions 35 are not limited to the above example.

Figure 10:
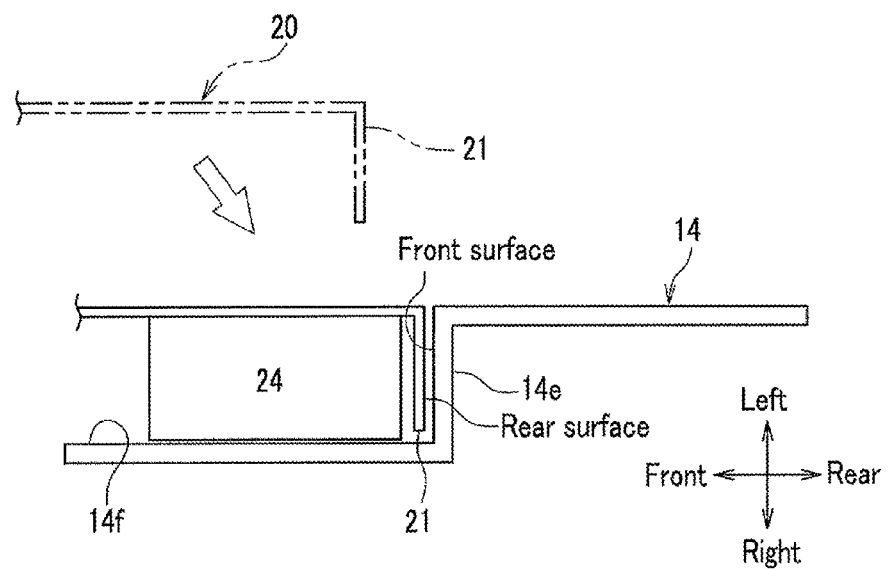
FIG. 10 is a schematic view schematically illustrating a state in which a rear surface of the bumper side wall faces a front surface of the fender side wall.
Figure 13:
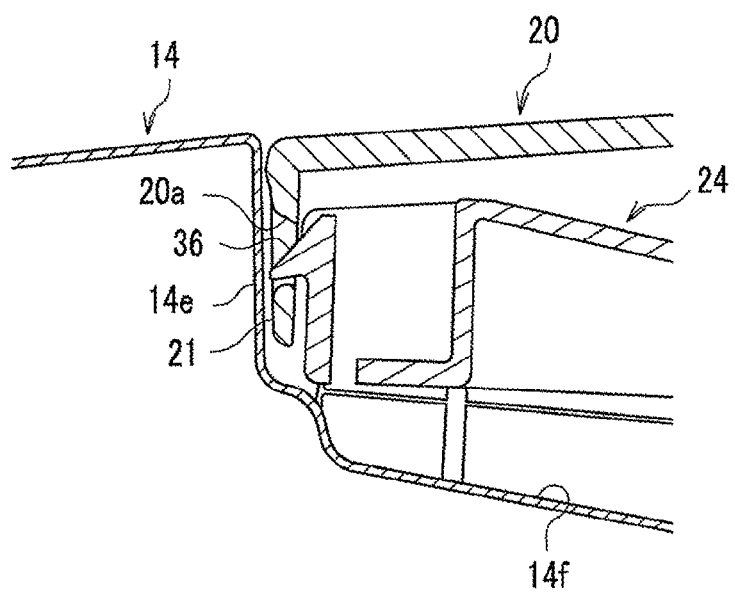
FIG. 13 is a longitudinal cross-sectional view along the XIII-XIII line indicated in FIG. 11.

The bumper face 20 has the bumper side wall 21, which is bent toward the inside of the vehicle body at the rear end of the bumper face 20 (as illustrated in FIGS. 12 and 13). As illustrated in FIG. 10, the rear surface of the bumper side wall 21 is arranged to face the front surface of the fender side wall 14e, which is bent toward the inside of the vehicle body at the front end of the fender panel 14. The bumper side wall 21 and the fender side wall 14e facing each other are arranged to have approximately identical dimensions along the direction of the axis of the spacer body 25.

Figure 11:
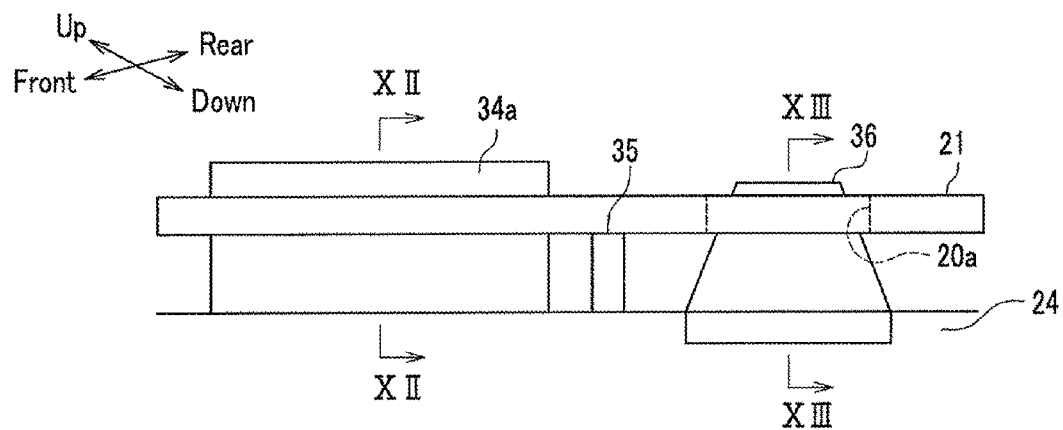
FIG. 11 is a schematic view schematically illustrating a state in which the bumper side wall of the bumper face is positioned by a first guide portion and a second guide portion in the bumper spacer.

In the above case, the bumper side wall 21 is held and positioned between the inner walls of the bent portions having the approximately L shape in the longitudinal cross sections of the first guide portions 34 and the protruding portions of the second guide portions 35 (as illustrated in FIG. 11). Therefore, high precision in arrangement of the border portion (as illustrated in FIG. 2) between the bumper face 20 (the rear surface of the bumper side wall 21) and the fender panel 14 (the front surface of the fender side wall 14e) can be achieved.

In addition, the pair of the clips 28a and 28b, which are integrally formed with the spacer body 25 to be spaced by the predetermined distance along the direction of the axis of the spacer body 25 and protrude downward, are arranged on the bottom surface portion of the bumper spacer 24.

The bumper-spacer lower-side fixing portion 32, which is integrally formed with the spacer body 25, is arranged in the lower end portion of the spacer body 25. The bumper-spacer lower-side fixing portion 32 includes a fixed hole 38 formed through the lower end portion at approximately the center of the lower end portion, multiple ribs 40 being arranged on the bottom surface portion of the spacer body 25 and radially extending from the fixed hole 38, and an annular rib 42 connecting the multiple ribs 40 in the circumferential direction and surrounds the fixed hole 38 (as illustrated in FIGS. 6 and 8).

The bumper-spacer lower-side fixing portion 32 has a function of joining and fixing a rear-side portion of the bumper face 20 near the wheel arch 22 to the lower end portion of the spacer body 25 by inserting a tapping screw (not shown) into the fixed hole 38. The multiple ribs 40 and the annular rib 42 are integrally formed with the spacer body 25.

A bumper-spacer reinforcing portion 44 being integrally formed with the spacer body 25 and extending from the lower end portion of the bumper spacer 24 toward the front side of the lower end portion of the fender panel 14 is arranged in a portion near the bumper-spacer lower-side fixing portion 32 (as illustrated in FIG. 3). The bumper-spacer reinforcing portion 44 is formed to have an approximately disk-like shape, and a fixed hole 46 through the bumper-spacer reinforcing portion 44 is formed at approximately the center of the bumper-spacer reinforcing portion 44.

As illustrated in FIGS. 4 and 8, a cutoff portion 48 for mounting an on-vehicle functional part is arranged in a vicinity of the bumper-spacer lower-side fixing portion 32. The cutoff portion 48 is formed by cutting off portions of the fender side wall 14e and the fender front-side step portion 14f.

A bumper-spacer rear-side fixing portion 50 which is overlapped with the front side of the lower end portion of the fender panel 14 is arranged at the center of the bumper-spacer reinforcing portion 44. The bumper-spacer reinforcing portion 44 is fixed to the lower end portion (the fender lower-end portion 14d) of the fender panel 14 in the bumper-spacer rear-side fixing portion 50 by inserting a grommet (not shown) and a tapping screw (not shown) into the fixed hole 46. Alternatively, another screw member and the like may be used instead of the tapping screw.

In the above case, the bumper-spacer rear-side fixing portion 50 is arranged to be located on the rear side of the fender front-side step portion 14f in the front-rear direction of the vehicle. In addition, as illustrated in FIG. 3, the first fender front-side fixing portion 26a, the second fender front-side fixing portion 26b, and the bumper-spacer lower-side fixing portion 32 are arranged on a virtual straight line L extending approximately parallel to the axis of the spacer body 25.

As illustrated in FIG. 6, reinforcing ribs 52a, which reinforce the base portion of the bumper-spacer reinforcing portion 44 extending toward the front side of the lower end portion of the fender panel 14, are arranged on a side portion of the spacer body 25 on the back side of the bumper-spacer reinforcing portion 44. In addition, as illustrated in FIG. 5, other reinforcing ribs 52b, which reinforce an extended portion of the bumper-spacer reinforcing portion 44, are arranged between the bumper-spacer reinforcing portion 44 and the bumper-spacer lower-side fixing portion 32 on the front side of the bumper-spacer reinforcing portion 44.

The vehicle 10 to which the vehicle bumper mounting structure according to the present embodiment is applied is basically constructed as above. Hereinbelow, the operations and advantages of the vehicle bumper mounting structure according to the present embodiment are explained.

Figure 9:
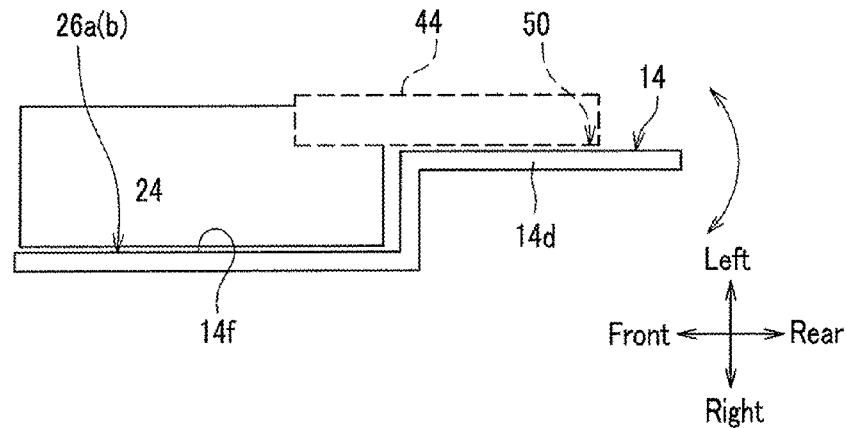
FIG. 9 is a schematic view schematically illustrating a relationship between the bumper spacer and the fender panel.

According to the present embodiment, the bumper-spacer rear-side fixing portion 50 is arranged in a position on the rear side of the fender front-side step portion 14f in the front-rear direction of the vehicle (as illustrated in FIG. 9). Therefore, the fender panel 14 can be fixed to the bumper spacer 24 even in the vicinity of the border portion between the bumper face 20 and the fender panel 14. Consequently, according to the present embodiment, it is possible to prevent rocking (as indicated by the arrows in FIG. 9), in the vehicle width direction (the right-left direction), of the front-side portion of the fender lower-end portion 14d in the fender panel 14. In addition, the border portion between the bumper face 20 and the fender panel 14 becomes even, so that the marketability is increased by the appearance.

In addition, according to the present embodiment, as illustrated in FIG. 4, the fender front-side step portion 14f in the fender panel 14 is integrally formed to extend from both of the tilted fender surface 14b and the vertical fender surface 14c. Therefore, the fender front-side step portion 14f has high rigidity and resists deformation, so that the fender front-side step portion 14f can firmly fix the bumper face 20. Since deformation of the bumper face 20 can be avoided and displacement in the front-rear direction of the vehicle can be prevented, the border portion between the bumper face 20 and the fender panel 14 becomes even, so that the marketability is increased by the appearance.

Further, according to the present embodiment, as illustrated in FIG. 7, the rear end portion of the bumper face 20 is fixed on the virtual straight line L passing through the bumper-spacer lower-side fixing portion 32, the first fender front-side fixing portion 26a, and the second fender front-side fixing portion 26b (as illustrated in FIG. 3). Therefore, it is possible to increase the support rigidity in the vehicle width direction (right-left direction), keep the precision in the outer surfaces of the wheel arch 22, the bumper face 20, and the fender panel 14, and improve the marketability by the appearance.

Furthermore, according to the present embodiment, all of the first fender front-side fixing portion 26a, the second fender front-side fixing portion 26b, and the bumper-spacer rear-side fixing portion 50 can be attached to the fender panel 14 from outside in the vehicle width direction. Therefore, it is possible to increase the support rigidity of the fender panel 14 in the vehicle width direction (right-left direction), and improve the work efficiency in the operation of mounting the bumper spacer 24.

Moreover, according to the present embodiment, as illustrated in FIGS. 4 and 8, for example, even in the case where the cutoff portion 48 for mounting an on-vehicle functional part is arranged in a vicinity of the fender lower-side step portion 14f, the strength of the bumper-spacer lower-side fixing portion 32 can be secured, so that it is possible to keep the precision in the outer surfaces of the wheel arch 22, the bumper face 20, and the fender panel 14, and improve the marketability by the appearance.

LIST OF REFERENCE SIGNS

10: Vehicle
14: Right and Left Fender Panels
14a: Ridge Portion
14b: Fender Tilted Surface
14c: Fender Vertical Surface
14d: Fender Lower-end Portion
14e: Fender Side Wall
14f: Fender Front-side Step Portion
20: Bumper Face
21: Bumper Side Wall
22: Wheel Arch
24: Bumper Spacer
25: Spacer Body

26a, 26b: Fender Front-side Fixing Portions
32: Bumper-spacer Lower-side Fixing Portion
38: Fixed Hole
40: Ribs
44: Bumper-spacer Reinforcing Portion
48: Cutoff Portion

The invention claimed is:

1. A vehicle bumper mounting structure in which a fender side wall is bent toward inside of a vehicle body at a front end portion of a fender panel, a fender front-side step portion is bent at an end portion of the fender side wall toward a direction away from the fender panel, and a bumper spacer is placed on the fender front-side step portion, characterized in that:
   the fender front-side step portion includes a fender front-side fixing portion being engaged with and fixing the bumper spacer;
   the bumper spacer includes:
      a spacer body,
      a bumper-spacer reinforcing portion extending from a lower end portion of the spacer body toward a lower end portion of the fender panel, and
      a bumper-spacer rear-side fixing portion being arranged in the bumper-spacer reinforcing portion, and being overlapped with and fixing a front side of the lower end portion of the fender panel; and
   the bumper-spacer rear-side fixing portion is arranged on a rear side of the fender front-side step portion in a front-rear direction of a vehicle.

2. The vehicle bumper mounting structure according to claim 1, wherein the fender panel includes a tilted fender surface formed on an upper side of a ridge portion and a vertical fender surface formed on a lower side of the ridge portion, the ridge portion extends approximately parallel to a wheel arch at a boundary between the tilted fender surface and the vertical fender surface in a vicinity of approximately a center of the fender panel, the fender front-side step portion is formed integrally with both of the tilted fender surface and the vertical fender surface, and at least one of the fender front-side fixing portion is arranged on each of the tilted fender surface side and the vertical fender surface side of the fender front-side step portion.

3. The vehicle bumper mounting structure according to claim 2, wherein: the bumper face, which is arranged in a front portion of the vehicle, is placed so that a rear surface of a bumper side wall which is bent toward inside of the vehicle at a rear end portion of the bumper face faces a front surface of the fender side wall, the bumper spacer is arranged at the lower end portion of the spacer body, and includes a bumper-spacer lower-side fixing portion which joins and fixes a portion of the bumper spacer located on a rear side of the bumper face and in a vicinity of the wheel arch, and the bumper-spacer lower-side fixing portion is arranged on a virtual straight line passing through centers of the one or more fender front-side fixing portions, which are arranged in plurality.

4. The vehicle bumper mounting structure according to claim 1, wherein the fender front-side fixing portion and the bumper-spacer rear-side fixing portion are mounted and fixed from outside in a vehicle width direction.

5. The vehicle bumper mounting structure according to claim 3, wherein ribs radially extending from a fixed hole are integrally formed in the bumper-spacer lower-side fixing portion, and the fixed hole is arranged at approximately a center of the bumper-spacer lower-side fixing portion.

* * * * *